(12) United States Patent
Samarasooriya et al.

(10) Patent No.: US 8,949,061 B2
(45) Date of Patent: Feb. 3, 2015

(54) METHOD AND APPARATUS FOR DETECTING THE PRESENCE OF A DTV PILOT TONE IN A HIGH NOISE ENVIRONMENT

(75) Inventors: Vajira Samarasooriya, Ottawa (CA); Daniel Payer, Rockland (CA); James S. Wight, Ottawa (CA)

(73) Assignee: Wi-Lan, Inc., Ottawa (CA)

( * ) Notice: Subject to any disclaimer, the term of this patent is extended or adjusted under 35 U.S.C. 154(b) by 590 days.

(21) Appl. No.: 13/182,172

(22) Filed: Jul. 13, 2011

(65) Prior Publication Data
US 2013/0018622 A1  Jan. 17, 2013

(51) Int. Cl.
*G06F 19/00* (2011.01)
*G01R 29/26* (2006.01)
*H04N 17/02* (2006.01)
*H04B 1/76* (2006.01)
*H04N 5/50* (2006.01)

(52) U.S. Cl.
CPC ... *H04B 1/76* (2013.01); *H04N 5/50* (2013.01)
USPC ............ 702/111; 324/613; 455/71; 348/181; 348/194; 348/725; 348/731; 375/317

(58) Field of Classification Search
CPC ............ H04L 27/2665; H04L 27/2614; H04L 27/2657; H04L 27/2659; H04L 27/0222; H04L 27/2636; H04L 27/266; H04N 5/91; H04N 5/911; H04N 5/50; H04N 17/004; H04N 7/0135; H04B 2001/10; H04B 2001/1027; H04B 2001/1072; H04B 17/0055; H04B 17/006; H04B 17/0062

USPC ......................................................... 702/111
See application file for complete search history.

(56) References Cited

U.S. PATENT DOCUMENTS

| | | | | |
|---|---|---|---|---|
| 6,456,653 | B1 * | 9/2002 | Sayeed ......................... | 375/227 |
| 7,586,976 | B1 * | 9/2009 | Duggan ........................ | 375/144 |
| 7,616,710 | B2 * | 11/2009 | Kim et al. ..................... | 375/334 |
| 2010/0119016 | A1 * | 5/2010 | Ghosh .......................... | 375/340 |
| 2010/0302459 | A1 * | 12/2010 | Zhang et al. .................. | 348/729 |
| 2011/0043710 | A1 | 2/2011 | Samarasooriya et al. | |
| 2012/0050547 | A1 * | 3/2012 | Gaddam ....................... | 348/192 |

OTHER PUBLICATIONS

Heinzel, G. et al; Spectrum and specral density esitmation by Discrete Fourier Transform (DFT), including a comprehensive list of window functions and some new flat-top windows; Feb. 15, 2002; p. 1-24.*

* cited by examiner

*Primary Examiner* — Eliseo Ramos Feliciano
*Assistant Examiner* — Terence Stifter, Jr.
(74) *Attorney, Agent, or Firm* — Procopio, Cory, Hargreaves & Savitch LLP (57) ABSTRACT

A DTV pilot tone is detected in a noisy environment by computing a power average of Fast Fourier Transform (FFT) output spectra of a received signal, finding a power peak in the averaged outputs, computing an adjustment parameter to center the power peak in a Discrete Fourier Transform bin of the averaged output spectra, applying the adjustment parameter to adjust the received signal, computing a coherent average of FFT output spectra of the adjusted signal, and, testing a power spectrum of the coherent average for the presence of the DTV pilot tone.

23 Claims, 7 Drawing Sheets

METHOD AND APPARATUS FOR DETECTING THE PRESENCE OF A DTV PILOT TONE IN A HIGH NOISE ENVIRONMENT

FIELD OF THE INVENTION

This invention relates in general to cognitive radio and to a method and apparatus for detecting the presence of a digital television pilot tone in a high noise environment.

BACKGROUND OF THE INVENTION

It has been shown that TV sensing devices are capable of sensing incumbent digital television (DTV) signals down to a level of −114 dBm using, for example, a white space spectrum sensor as described in United States patent application 20110043710A1 published Feb. 24, 2011.

FCC 47 CFR Part-15 and FCC 10-174 specify that TV Band sensing devices are expected to sense incumbent DTV signals down to a level of −114 dBm in the presence of adjacent channel DTV signals that can be as strong as −28 dBm. Known sensing devices are incapable of sensing the presence of a DTV signal at a level of −114 dBm in the presence of strong adjacent channel interference in the order of −28 dBm.

The channel signal-to-noise ratio (SNR) encountered by a TV Band sensing device can be as low as −14 dB even for a TV Band sensing device with an analog front-end noise figure as low as 6 dB. One technique that can be employed to sense the presence of an incumbent DTV signal when the SNR is very low involves sensing only for the DTV Pilot tone. The DTV Pilot tone is a pure tone that has a designated power level that is 11.62 dB below the transmitted total DTV signal power.

However, the presence of a strong −28 dBm adjacent-channel interference poses a significant challenge for sensing the presence of the DTV pilot tone. Moreover, the presence of adjacent-channel interference generated by lower frequency (left adjacent) channel makes pilot-sensing even more difficult because the strong out-of-band emissions from the left-adjacent channel masks the pilot position side of the 6 MHz TV channel bandwidth.

It can be shown by computation that the Pilot Carrier-to-Noise Ratio (CNR) in a 1 Hz bandwidth is about 6.37 dB, assuming that a left adjacent channel of −28 dBm is present with a sensed channel DTV signal level of −114 dBm. This computation assumes that the left adjacent-channel DTV signal conforms precisely to the FCC DTV emissions mask.

For any given CNR ratio, there is a finite probability of detecting an incumbent signal. There is also a finite probability of false alarm, i.e., an incumbent signal is "declared" even though it is not actually present. To avoid interference with an incumbent DTV signal, it is important to keep the probability of detection high. However, in order to permit secondary user access to unoccupied TV channels, it is important to keep the probability of false alarm low.

The FCC has set a probability of detection of over 90%, with a probability of false alarm not exceeding 10% as an acceptable sensing performance for a TV Band device in sensing for incumbent DTV signals. The FCC has further required that each DTV channel be sensed over a minimum interval of 30 seconds before declaring the presence or absence of an incumbent signal.

Detecting the presence of the pilot at a CNR of 6.37 dB (over 1 Hz) to meet the above detection and false alarm specifications, and accomplishing that in less than 30 seconds is a formidable challenge.

There therefore exists a need for a method and apparatus for detecting the presence of a DTV pilot tone in a high noise environment.

SUMMARY OF THE INVENTION

Systems and methods for detecting the presence of a DTV pilot tone in a high noise environment are provided.

One embodiment therefore provides a method of detecting the presence of a digital television (DTV) pilot tone in a high noise environment, includes computing a power average of Fast Fourier Transform (FFT) output spectra of a digital baseband signal derived from a TV band channel; estimating a power peak in the averaged output spectra; computing an adjustment parameter to adjust the signal to center the power peak in a Discrete Fourier Transform (DFT) bin of the FFT output spectra; applying the computed parameter to adjust the signal; computing a coherent average of FFT output spectra of the adjusted signal; computing a power spectrum of the coherent averaged output spectra; testing the power spectrum for the DTV pilot tone; and determining whether the test exceeds a threshold.

One embodiment further provides an apparatus that detects the presence of a digital television (DTV) pilot tone in a high noise environment, includes a spectrum power averager that averages output spectra of a Fast Fourier Transform (FFT) of a baseband signal derived from a television band channel; a peak frequency estimator that estimates a peak power of the averaged output spectra, determines a frequency of the peak power and computes a frequency adjustment parameter to center the peak power in a Discrete Fourier Transform bin of the output spectra; a complex frequency shifter that uses the frequency adjustment parameter to adjust a frequency of the signal to center the peak power in the Discrete Fourier Transform bin; a spectrum coherent averager that averages output spectra of a FFT of the baseband signal at the adjusted frequency and computes a power spectrum from the coherent average; a peak search algorithm that computes a peak power in the computed power spectrum; a noise floor estimator that computes a noise floor around the peak power of the computed power spectrum; and a pilot tone tester that compares the peak power of the computed power spectrum with the noise floor to determine if the DTV pilot tone has been detected.

One embodiment yet further provides an apparatus that detects the presence of a digital television (DTV) pilot tone in a high noise environment, includes a spectrum power averager that averages output spectra of a Fast Fourier Transform (FFT) of a baseband signal derived from a television band channel; a peak frequency estimator that estimates a peak power of the averaged output spectra, determines a frequency of the peak power and computes a frequency adjustment parameter to center the peak power in a Discrete Fourier Transform bin of the FFT output spectrum; an analog radio frequency front end which uses the sampling rate adjustment parameter to re-program a high-resolution programmable phase locked loop (PLL) that permits a tuning frequency to be programmed to effect the frequency adjustment; a spectrum coherent averager that averages output spectra of a FFT of the baseband signal at the adjusted frequency and computes a power spectrum from the coherent average; a peak search algorithm that computes a peak power in the computed power spectrum; a noise floor estimator that computes a noise floor around the peak power of the computed power spectrum; and a pilot tone tester that compares the peak power of the computed power spectrum with the noise floor to determine if the DTV pilot tone has been detected.

One embodiment still further provides an apparatus that detects the presence of a digital television (DTV) pilot tone in a high noise environment, includes a spectrum power averager that averages output spectra of a Fast Fourier Transform (FFT) of a baseband signal derived from a television band channel; a peak frequency estimator that estimates a peak power of the averaged output spectra, determines a frequency of the peak power and computes a frequency adjustment parameter to center the peak power in a Discrete Fourier Transform bin of the output spectrum; a digital mixer that uses the frequency adjustment parameter to re-program a digital phase locked loop or a direct digital synthesizer that permits a mixing frequency to be tuned to effect the frequency adjustment; a spectrum coherent averager that averages output spectra of a FFT of the baseband signal at the adjusted frequency and computes a power spectrum from the coherent average; a peak search algorithm that computes a peak power in the computed power spectrum; a noise floor estimator that computes a noise floor around the peak power of the computed power spectrum; and a pilot tone tester that compares the peak power of the computed power spectrum with the noise floor to determine if the DTV pilot tone has been detected.

One embodiment yet further provides an Apparatus that detects the presence of a digital television (DTV) pilot tone in a high noise environment, includes a spectrum power averager that averages output spectra of a Fast Fourier Transform (FFT) of a baseband signal derived from a television band channel; a peak frequency estimator that estimates a peak power of the averaged output spectra, determines a frequency of the peak power and computes a sampling rate adjustment parameter to center the peak power in a Discrete Fourier Transform bin of the output spectrum; a phase-locked loop that generates an analog-to-digital sampling clock and uses the sampling rate adjustment parameter to adjust the analog-to-digital sampling clock to effect the sampling rate adjustment; a spectrum coherent averager that averages output spectra of a FFT of the baseband signal at the adjusted sampling rate and computes a power spectrum from the coherent average; a peak search algorithm that computes a peak power in the computed power spectrum; a noise floor estimator that computes a noise floor around the peak power of the computed power spectrum; and a pilot tone tester that compares the peak power of the computed power spectrum with the noise floor to determine if the DTV pilot tone has been detected.

One embodiment also provides an Apparatus that detects the presence of a digital television (DTV) pilot tone in a high noise environment, includes a spectrum power averager that averages output spectra of a Fast Fourier Transform (FFT) of a baseband signal derived from a television band channel; a peak frequency estimator that estimates a peak power of the averaged output spectra, determines a frequency of the peak power and computes a fractional rate adjustment parameter to center the peak power in a Discrete Fourier Transform (DFT) bin of the output spectrum; a fractional sampling rate converter that uses the fractional rate adjustment parameter to adjust the sampling rate to center the peak power in the DFT bin; a spectrum coherent averager that averages output spectra of a FFT of the baseband signal at the adjusted sampling rate and computes a power spectrum from the coherent average; a peak search algorithm that computes a peak power in the computed power spectrum; a noise floor estimator that computes a noise floor around the peak power of the computed power spectrum; and a pilot tone tester that compares the peak power of the computed power spectrum with the noise floor to determine if the DTV pilot tone has been detected.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE PREFERRED EMBODIMENTS

In order to determine the presence of an incumbent TV band signal within the constraints of a given probability of detection and a given probability of false alarm, a signal from a front-end of a TV band sensing device is investigated in the frequency domain for the presence of a DTV pilot tone. This is accomplished using an FFT operation. However, in an environment with a low signal-to-noise ratio (SNR) the variance of the noise may yield frequency samples having a magnitude that rivals that of the DTV pilot tone, resulting in a significant probability of false alarm. This probability of false alarm is reduced by averaging outputs of several successive FFT operations prior to investigating the averaged spectra for the presence of the DTV pilot tone.

In a typical sensing environment, the signal received at the input of the FFT processor of TV Band Sensing Device can contain frequency errors. Typical sources of these frequency errors include both transmitter and receiver local oscillator inaccuracies. The pilot tone in a typical received DTV signal may therefore be offset from its nominal frequency. The presence of the DTV pilot tone is therefore searched for within a band of frequencies in the received DTV signal spectrum. The width of that band of frequencies represents the maximum expected frequency deviation or error in the DTV pilot tone with respect to its nominal frequency. Consequently, the data sampling frequency at the input of the FFT processor (which is related to the ADC sampling clock by an integer ratio) may not be an integer multiple of the DTV pilot frequency at the FFT input. Even in the case of no frequency error in the received DTV signal, hardware limitations often limit the frequency of the ADC sampling clock, thereby making the ADC sampling clock unequal to an integer multiple of the DTV pilot frequency.

As a result, the DTV pilot frequency location within the output of the FFT processor is not likely to coincide with any one of the set of DFT bin frequencies. The peak power of the FFT spectrum may therefore fall between two DFT bin values. In investigating for the presence of the DTV pilot tone under strong adjacent-channel interference, it is advantageous to average the spectra such that the DTV pilot frequency component is averaged coherently and the noise and adjacent-channel energy is averaged non-coherently. Coherent averaging of the DTV pilot frequency component results in DTV pilot energy rising above the noise plus interference floor. This is due to the fact that the non-coherently averaged noise and interfering energy components are canceled while the coherently averaged pilot signal component retains its energy in the averaged spectrum. Therefore, in order to increase the confidence of the pilot-sensing algorithm, it is desirable to compute the frequency spectrum of the received signal when the DTV pilot frequency coincides with that of a DFT-bin frequency.

Once the pilot tone is identified, its frequency is estimated and a baseband frequency is adjusted, or the signal sampling rate is adjusted, to center the frequency of the DTV pilot tone within a DFT bin. Coherent averaging of successive FFT outputs is then performed to make noise values more uniform across the frequency samples and increase the magnitude of the pilot tone. Using this method, the false alarm rate is significantly reduced, even in very noisy environments where the SNR is low.

Figure 1:
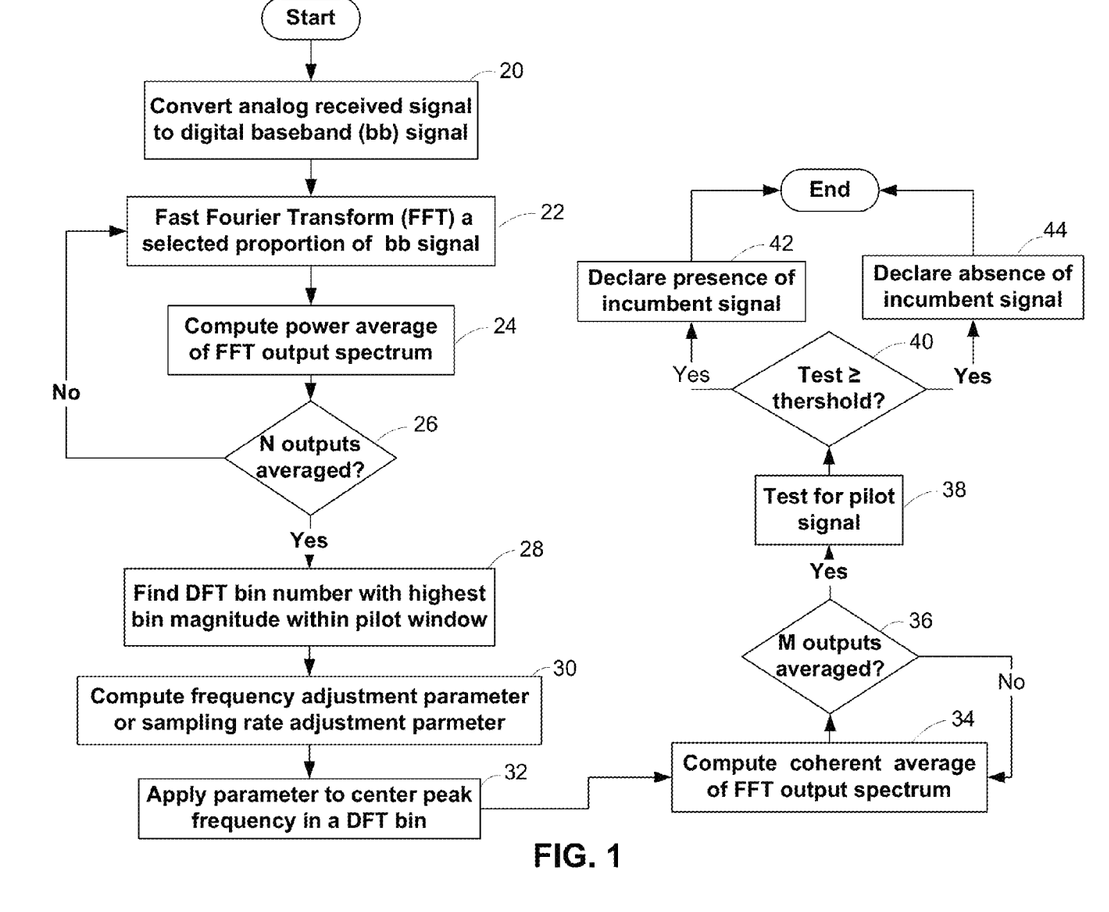
FIG. 1 is a flow chart illustrating principal steps of an embodiment of a method in accordance with the invention.

FIG. 1 is a flow chart illustrating the principal steps of an embodiment of a method in accordance with the invention. The illustrated method can be implemented by the devices depicted in FIGS. 3-7. The signal received by an analog front end of a TV band device is converted (20) to a digital baseband signal in a manner known in the art. A sampling frequency $f_{s\_bb}$ of the baseband signal is defined as:

$$f_{s\_bb} = f_{adc}/N_{dec} \qquad \text{eq. 1}$$

Where:
$f_{adc}$ is a sampling frequency of an analog to digital converter of the TV band device; and
$N_{dec}$ is a decimation factor used to reduce the sampling frequency at the analog-to-digital converter to the sampling frequency at baseband.

The baseband signal is processed (22) by a Fast Fourier Transform (FFT) to compute a Discrete Fourier Transform (DFT) of the signal, as will be explained below in more detail. As is well known, the pilot tone frequency in a received DTV signal can be offset from its specified frequency for many reasons. For example, DTV transmitters can have a frequency tolerance of ±1 KHz, and sensing receivers can also have frequency tolerances that can result in a frequency error of up to a few kilohertz in the received DTV signal. As a result, the received DTV pilot tone frequency can be a few KHz on either side of its specified frequency.

The anticipated frequency uncertainty can be defined as:

$$n_W = \frac{f_e}{(f_{s\_bb}/N_{DFT})} \qquad \text{eq. 2}$$

Where:
$n_W$ is the number of FFT bins representing an anticipated frequency uncertainty of the DTV pilot tone around the specified frequency;
$f_e$ is the anticipated uncertainty of an actual position of the DTV pilot tone with respect to the specified frequency; and
$N_{DFT}$ is the Discrete Fourier Transform length.

Analysis and experimentation has shown that a DFT length of about 32 Kb is sufficient, though DFTs of 64 Kb or more may also be used for the same purpose.

After each FFT operation, a power average ($\overline{P}_k$) of the FFT output spectrum is computed (24) using:

$$\overline{P}_k = \frac{1}{N}\sum_{i=1}^{N} |X_k^{real}(i) + jX_k^{imag}(i)|^2 \qquad \text{eq. 3}$$

Where:
$|X_k(i)| = |X_k^{real}(i) + jX_k^{imag}(i)|$ is the DFT magnitude for DFT bin k during i-th FFT-cycle; and
k=1, 2, ..., $N_{FFT}$; and
N is the number of FFT averages.

At the end of each FFT output averaging cycle, it is determined (26) whether a predetermined number "N" of FFT spectrum outputs have been averaged. If not, the processes returns to step (22) and FFT transformation and power averaging (24) continues until the target N is attained. In one embodiment, N equals 40. After N FFT spectrum outputs have been averaged, a DFT bin with the highest bin magnitude within the pilot window is located (28). A signal frequency adjustment parameter or a sampling frequency adjustment parameter is then computed (30).

The frequency adjustment parameter is computed by first performing an interpolation in the frequency domain to estimate a power peak of the power averaged FFT spectra. In one embodiment of the invention a parabolic interpolation is used, although any one of the many other types of interpolation known in the art may also be used for this purpose.

Figure 2:
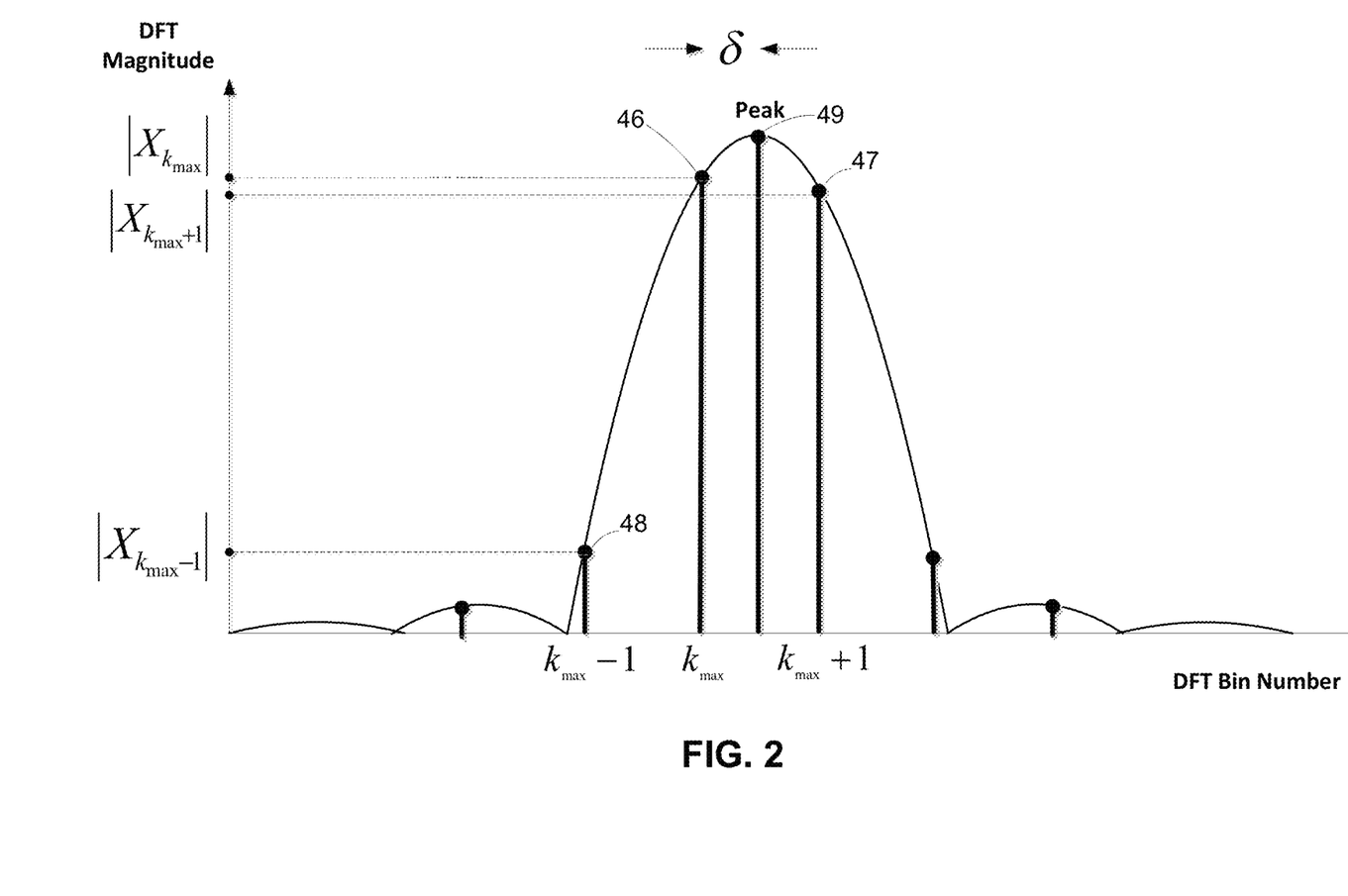
FIG. 2 is a graph schematically illustrating an interpolation performed in the frequency domain to estimate a peak power magnitude of FFT spectra that have been power averaged.

FIG. 2 is a graph schematically illustrating an interpolation performed in the frequency domain to estimate a peak power magnitude of FFT spectra that have been power averaged in accordance with an embodiment of the invention. The power averaged spectrum is investigated to locate a DFT bin ($k_{max}$) with the highest power magnitude 46. A power magnitude 47 of the next DFT bin ($k_{max}+1$) is then determined, and a power magnitude 47 of the previous DFT bin ($k_{max}-1$) is also determined. These values are then used in any selected interpolation algorithm to estimate the power peak 49.

With reference once more to FIG. 1, after the power peak has been estimated, a normalized offset (δ) of that estimated peak from the frequency of the DFT bin ($k_{max}$) is computed as follows:

$$\delta = \frac{|X_{k_{max}+1}| - |X_{k_{max}-1}|}{2 \times (2 \times |X_{k_{max}}| - |X_{k_{max}+1}| - |X_{k_{max}-1}|)} \qquad \text{eq. 4}$$

Where:
$k_{max}$ is the DFT bin number with a maximum bin magnitude;
$k_{max}+1$ is the next higher DFT bin number; and
$k_{max}-1$ is the next lower DFT bin number.

A frequency offset ($\Delta f$) of the DTV pilot tone with respect to the center of a DFT bin is then computed as follows:

$$\Delta f = \left(\frac{f_{s\_bb}}{N_{DFT}}\right) \times \delta \qquad \text{eq. 5}$$

Where:
$f_{s\_bb}$ is the signal sampling rate; and
$N_{DFT}$ is the DFT length.

The frequency ($f_P$) of the power peak is then estimated as follows:

$$f_P = (k_{max} + \delta) \times \left(\frac{f_{s\_bb}}{N_{DFT}}\right) \qquad \text{eq. 6}$$

And, a frequency adjustment parameter ($f_{Corr}$) is computed (30) as follows:

$$f_{corr} = -\Delta f = -\left(\frac{f_{s\_bb}}{N_{DFT}}\right) \times \delta \qquad \text{eq. 7}$$

After the frequency adjustment parameter has been computed (30), the frequency is adjusted (32) to center the DTV pilot tone in one of the DFT bins using any one of a number of techniques, three examples of which will be described below in more detail with reference to FIGS. 2-4.

Alternatively, a sampling frequency adjustment parameter is computed (30), as will be described below in more detail with reference to FIGS. 5 and 6.

Regardless of the adjustment parameter computed in step (30), the adjustment parameter is applied (32) to center the peak frequency in a DFT bin of the FFT output spectrum.

A coherent average of M adjusted FFT output spectra is then computed (34) as follows:

$$\overline{X}_k = \frac{1}{M} \sum_{i=1}^{M} (X_k^{real}(i) + j X_k^{imag}(i)) \qquad \text{eq. 8}$$

Where:
k=1, 2, . . . , $N_{FFT}$; and
i=1, 2, . . . , M; and
$X_k^{real}(i)$ & $X_k^{imag}(i)$ are the in-phase and quadrature components of the FFT output of the k-th bin in the i-th averaging cycle of M cycles.

After each coherent averaging operation, it is determined (36) whether M FFT output spectra have been averaged. If not, the coherent averaging operations continue until M coherent averaging operations have been performed. In one embodiment, M equals 30.

A power spectrum of the $M^{th}$ coherent average is then computed, and the power spectrum is tested (38) for a DTV pilot tone. In one embodiment, the test for the DTV pilot tone involves a search for a peak power ($P_{Max}$) in the power spectrum computed from the $M^{th}$ FFT spectra average. The DFT bin number ($k_{peak}$) with $P_{Max}$ is then identified. Once $k_{peak}$ has been identified, a noise floor around $P_{Max}$ is computed using a programmable number ($k_N$) of DFT bins around $P_{Max}$. In one embodiment, $k_N$ equals 6. $K_{N\text{-}PSD}$ defines a set of DFT bins used to compute the noise floor power spectral density ($N_{PSD}$) as follows:

$$K_{N\text{-}PSD} = \lfloor k_{peak}-1-k_N, k_{peak}-2 \rfloor \cup \lfloor k_{peak}+2, k_{peak}+k_N \rfloor \qquad \text{eq. 9}$$

The noise power spectral density in then computed using the following DFT bins:

$$k \in K_{N\text{-}PSD} \qquad \text{eq. 10}$$

$N_{PSD}$ is computed as follows:

$$N_{PSD} = \left(\frac{1}{2 \times k_N}\right) \sum_{k \in K_N - PSD} |X_k|^2 \qquad \text{eq. 11}$$

After $N_{PSD}$ has been computed, the peak power $P_{Max}$ is tested to see if it can be declared to be a DTV pilot tone. In one embodiment, $P_{Max}$ is divided by $N_{PSD}$ and the resulting test statistic is compared (40) to a programmable threshold ($\tau$), as follows:

$$\frac{p_{max}}{N_{PSD}} \geq \tau \qquad \text{eq. 12}$$

In one embodiment, $\tau$ is equal to 0.5. If it is determined (40) that the test statistic $$\left(\frac{p_{max}}{N_{PSD}}\right)$$

is greater than or equal to the threshold, the presence of an incumbent signal (DTV pilot tone) is declared (42). If not the absence of an incumbent signal (DTV pilot tone) is declared (44). The declaring of steps 42 and 44 can include communicating the information to the portion of the TV band device which is responsible for channel selection which then uses that information in selecting which channel to operate in.

Figure 3:
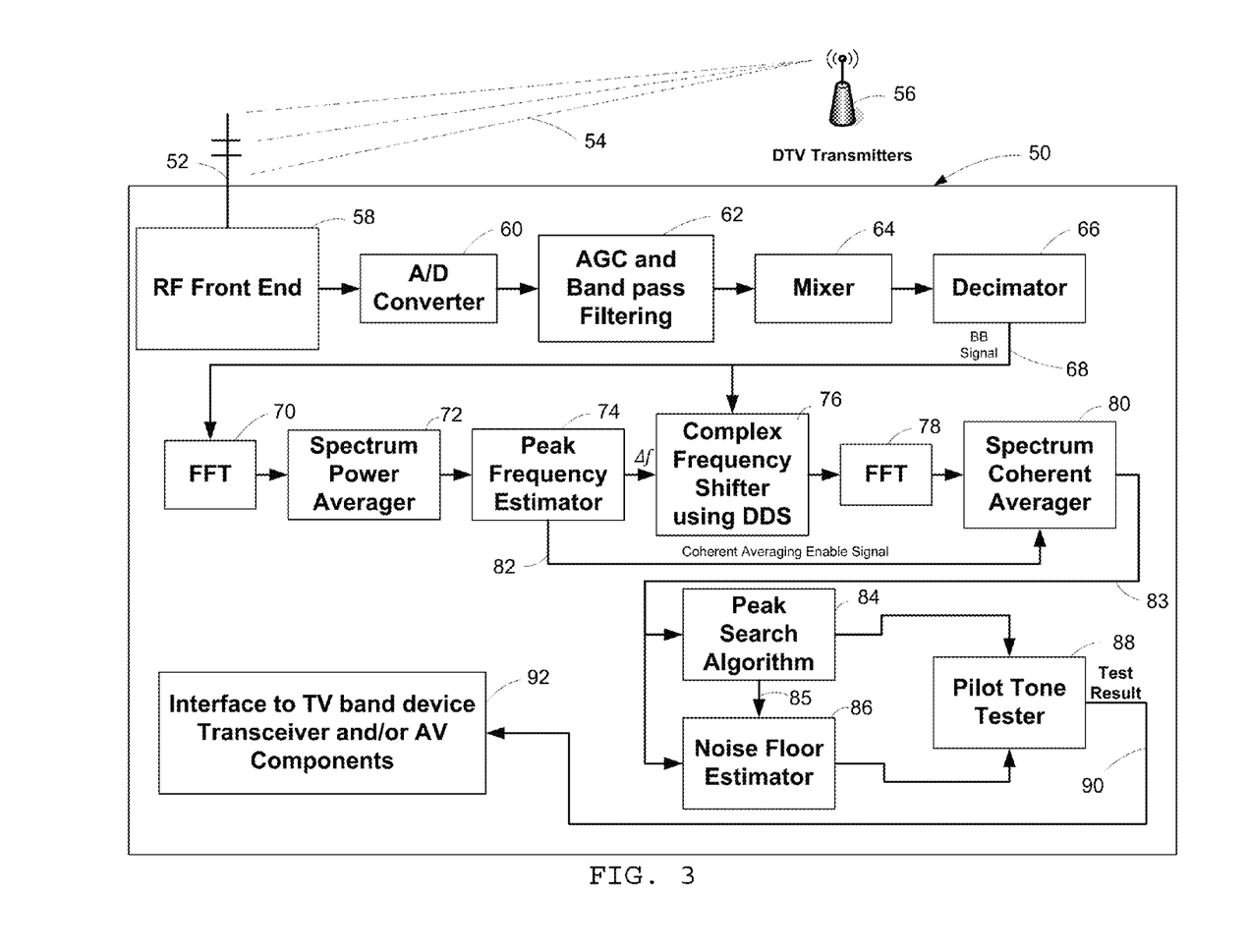
FIG. 3 is a functional block diagram of a TV band device showing the functional blocks of the apparatus in accordance with one embodiment of the invention.

FIG. 3 is a functional block diagram of a 50 equipped with apparatus in accordance with one embodiment of the invention. A TV band device is a radio frequency device which can operate (transmit and/or receive) in vacant or unused TV frequency channels. Elements of the TV band device not relevant to this discussion are not shown for ease of description. The TV band device 50 has an incumbent signal sensing antenna 52, which may or may not be used for other send/receive functions of the TV band device 50. The antenna 52 receives signals 54 broadcast by DTV transmitters 56 in a manner well known in the art. The received signals 54 are processed by an analog radio frequency (RF) front end 58, also in a manner known in the art. The RF front end 58 outputs an analog intermediate frequency signal derived from the received signal to an analog-to-digital (A/D) converter 60, which samples the analog intermediate frequency signal at a predetermined sampling rate to convert the analog intermediate frequency signal to a digital signal. The digital signal is processed by an automatic gain controller (AGC) and band pass filter(s) 62, a digital mixer 64 and a decimator 66, which outputs a baseband (BB) signal 68, all of which is also well known in the art. The baseband signal 68 is fed into a Fast Fourier Transform (FFT) 70, which outputs a Discrete Fourier Transform (DFT) spectrum in a manner well known in the art. The output spectrum is processed by a spectrum power averager 72 to compute ($\overline{P}_k$), as described above with reference to FIG. 1. After N averages have been computed a peak frequency estimator 74 computes a peak frequency in the N$^{th}$ output of the spectrum power averager 72 and computes the baseband frequency adjustment parameter (Δf), as described above with reference to FIG. 1. The baseband frequency adjustment parameter is passed to a complex frequency shifter 76, which likewise receives the baseband signal 68 from the decimator 66. In this embodiment, the complex frequency shifter 76 is implemented using a direct digital synthesizer (DDS). The DDS of the complex frequency shifter 76 synthesizes a baseband frequency adjustment factor ($e^{j2\Delta fkT}$s_bb) where $$T_{s\_bb} = \frac{1}{f_{s\_bb}}.$$

The baseband frequency adjustment factor is multiplied with the baseband signal 68 by the complex frequency shifter 76 to adjust the frequency of the baseband signal so that the peak frequency is centered in the DFT bin.

The frequency adjusted output of the complex-multiplication operation by the complex frequency shifter 76 is output to an FFT 78 which processes the signal and outputs a DFT spectrum to a spectrum coherent averager 80. The spectrum coherent averager 80 receives a coherent averaging enable signal 82 from the peak frequency estimator 74 after the peak frequency estimator 74 has computed the frequency adjustment parameter. As explained above with reference to FIG. 1, once the complex frequency shifter has adjusted the frequency using the frequency adjustment factor, and the spectrum coherent averager 80 has computed M averages of the frequency adjusted output of the FFT 78, it computes the power spectrum of the M$^{th}$ average and sends a peak search enable signal via connection 83 to a peak search algorithm 84. The peak search algorithm 84 finds a peak power (P$_{Max}$) in the M$^{th}$ power spectrum output by the spectrum coherent averager 80, and computes the DFT bins to be used by a noise floor estimator 86. The two sets of DFT bin numbers to be used by the noise floor estimator 86 are passed by the peak search algorithm 84 via connection 85, and the noise floor estimator 86 computes the noise power spectral density (N$_{PSD}$) of the two sets of DFT bins, as described above with reference to FIG. 1. (P$_{Max}$) and (N$_{PSD}$) are then respectively passed to the pilot tone tester 88, which determines whether an incumbent signal has been sensed by dividing (P$_{Max}$) by (N$_{PSD}$) to compute the test statistic, and determining whether the test statistic exceeds the threshold (τ), as also explained above with reference to FIG. 1. The test result is sent via a connection 90 to an interface 92 to TV band device transceiver and/or audio visual (AV) components which use the test result to select a TV white space channel in a manner well known in the art.

Figure 4:
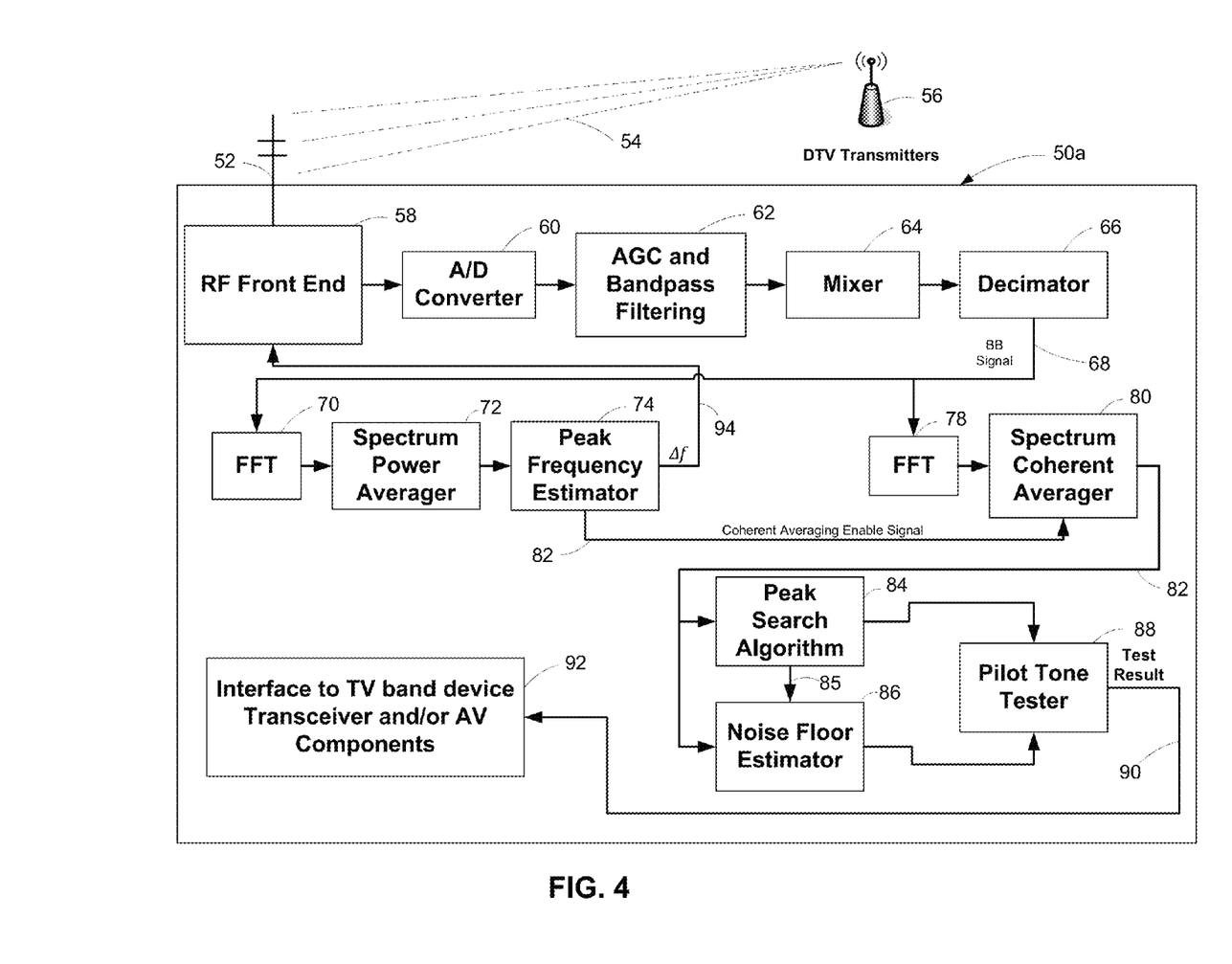
FIG. 4 is a functional block diagram of a TV band device showing the functional blocks of the apparatus in accordance with another embodiment of the invention.

FIG. 4 is a functional block diagram of a TV band device 50*a* equipped with apparatus in accordance with another embodiment of the invention. The TV band device 50*a* operates the same as the TV band device 50 described above with reference to FIG. 3 except that the frequency adjustment is effected by the analog RF front end 58 which adjusts a frequency of an intermediate frequency signal output to the A/D converter 60, rather than by the complex frequency shifter 76 described above with reference to FIG. 3. The peak frequency estimator 74 outputs the frequency adjustment parameter (Δf) to the RF front end 58, which uses the frequency adjustment parameter to re-program a high-resolution programmable phase locked loop (PLL) that permits a tuning frequency of the RF front end 58 to be programmed to effect the desired frequency adjustment of the intermediate frequency, as will be understood by those skilled in the art. In all other respects, the TV band device 50*a* operates the same as the TV band device 50 described above with reference to FIG. 3.

Figure 5:
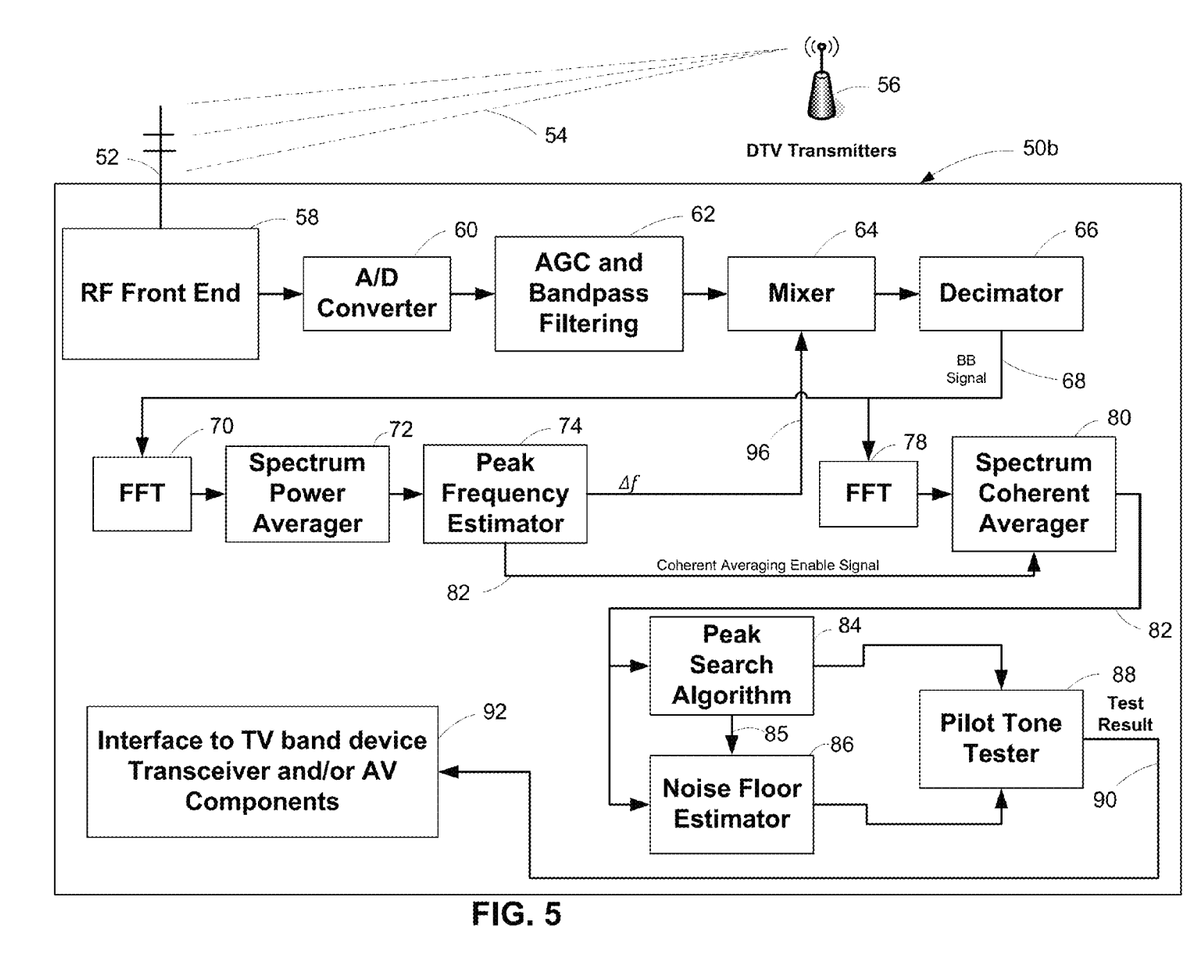
FIG. 5 is a functional block diagram of a TV band device showing the functional blocks of the apparatus in accordance with a further embodiment of the invention.

FIG. 5 is a functional block diagram of a TV band device 50*b* equipped with apparatus in accordance with a further embodiment of the invention. The TV band device 50*b* operates the same as the TV band device 50 described above with reference to FIG. 3 except that the frequency adjustment is effected by the digital mixer 64, rather than the complex frequency shifter 76 described above with reference to FIG. 3. The peak frequency estimator 74 outputs the frequency adjustment parameter (Δf) to the digital mixer 64, which uses the frequency adjustment parameter to re-program a digital PLL or DDS that permits the mixing frequency of the intermediate frequency signal to be tuned via a programmable register. In all other respects, the TV band device 50*b* operates the same as the TV band device 50 described above with reference to FIG. 3.

Figure 6:
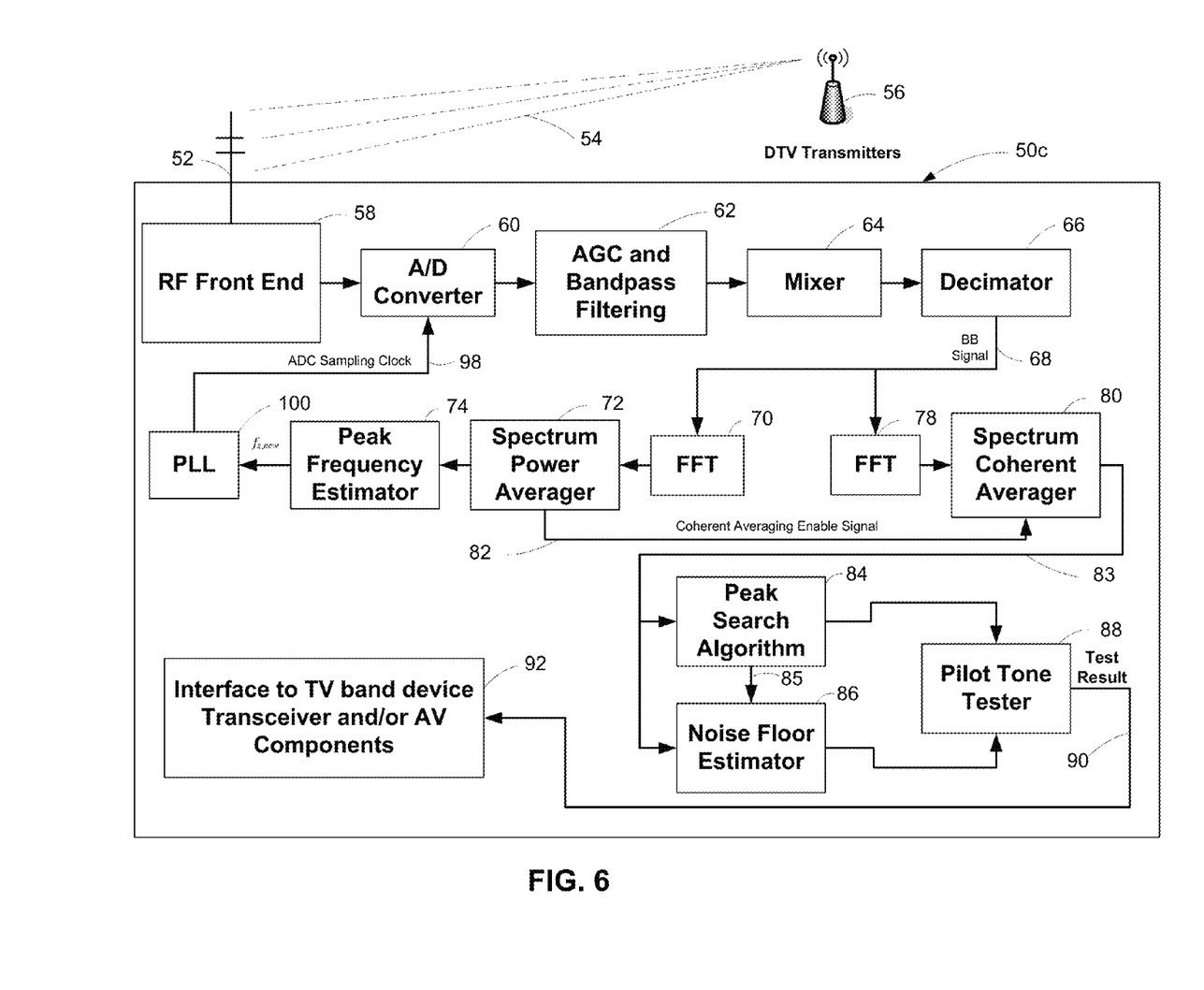
FIG. 6 is a functional block diagram of a TV band device showing the functional blocks of the apparatus in accordance with yet another embodiment of the invention.

FIG. 6 is a functional block diagram of a TV band device 50*c* equipped with apparatus in accordance with yet another embodiment of the invention. The TV band device 50*c* operates the same as the TV band device 50 described above with reference to FIG. 3 except that a sampling rate adjustment is effected by a PLL 100 that generates a sampling clock for the A/D converter 60, rather than the frequency adjustment effected by the complex frequency shifter 76 described above with reference to FIG. 3. The peak frequency estimator 74 outputs a sampling rate adjustment parameter (f$_{s\_new}$) to the PLL 100, which uses the sampling rate adjustment parameter to adjust the ADC sampling clock 98. The peak frequency estimator computes the sampling rate adjustment parameter as follows:

$$\delta = \frac{|X_{k_{max}+1}| - |X_{k_{max}-1}|}{2 \times (2 \times |X_{k_{max}}| - |X_{k_{max}+1}| - |X_{k_{max}-1}|)} \quad \text{eq. 4}$$

$$\beta = \frac{\delta}{k_{max}} \quad \text{eq. 13}$$

$$f_{adc\_new} = f_{adc} \times (1 + \beta) \quad \text{eq. 14}$$

Where:

f$_{adc}$ is the A/D converter sampling clock frequency generated by the PLL; and f$_{adc\_new}$ is the adjusted sampling rate parameter.

In all other respects, the TV band device 50*c* operates the same as the TV band device 50 described above with reference to FIG. 3.

Figure 7:
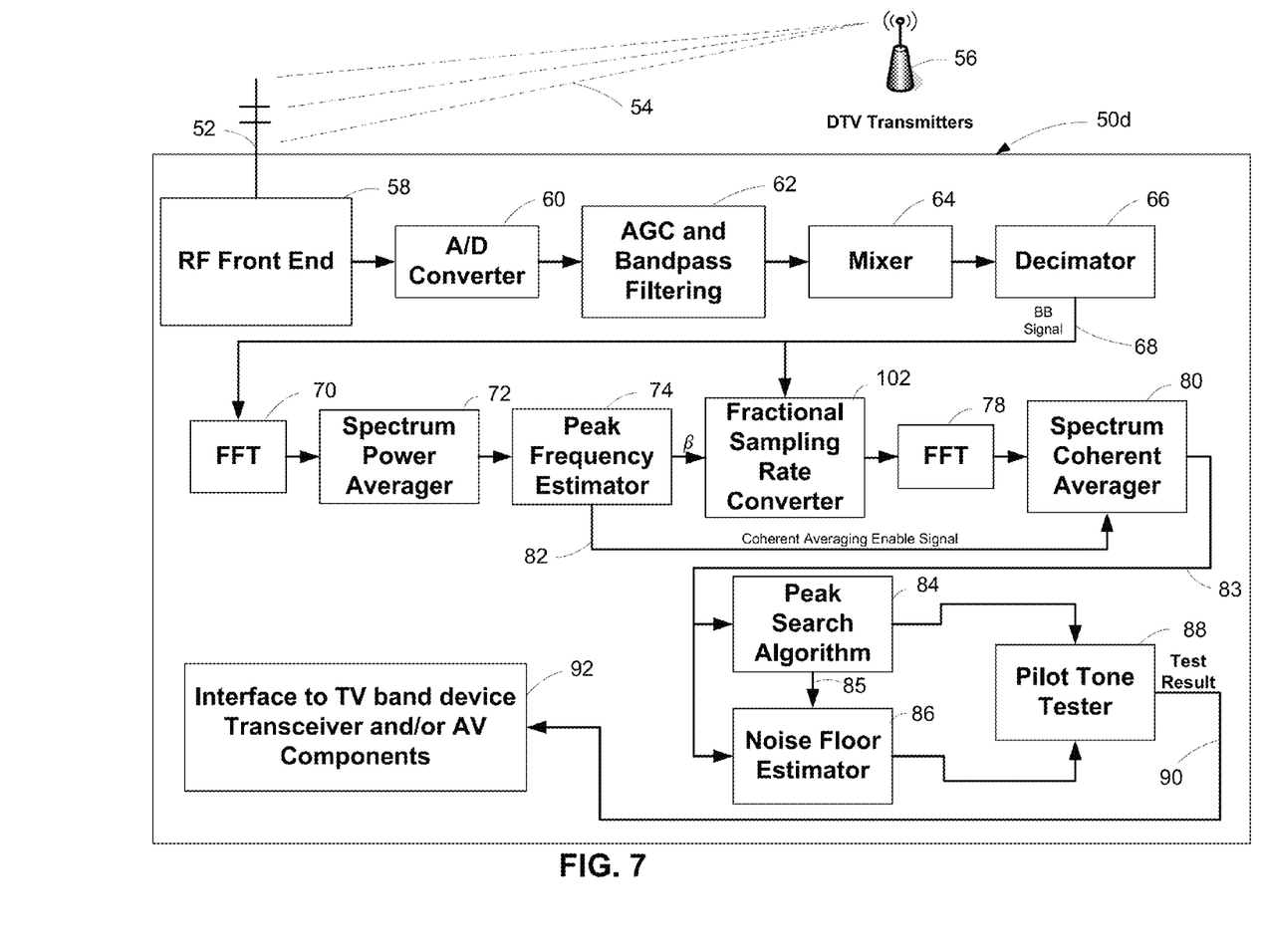
FIG. 7 is a functional block diagram of a TV band device showing the functional blocks of the apparatus in accordance with yet a further embodiment of the invention.

FIG. 7 is a functional block diagram of a TV band device 50*d* equipped with apparatus in accordance with yet a further embodiment of the invention. The TV band device 50*d* operates the same as the TV band device 50*c* described above with reference to FIG. 6 except that the sampling rate adjustment is effected by a fractional sampling rate converter 102. The fractional sampling rate converter 102 receives the baseband signal 68 from the decimator 66 and a fractional rate adjustment parameter (β) from the peak frequency estimator 74. The peak frequency estimator computes the sampling rate adjustment parameter (β) using equation 14. The fractional sampling rate converter 102 uses the rate adjustment parameter (β) to adjust the frequency of the baseband signal 68 as follows:

$$f_{s\_bb\_new} = f_{s\_bb} \times (1+\beta) \quad \text{eq. 15}$$

Where: f$_{s\_bb\_new}$ is the adjusted sampling rate.

The fractional sampling rate converter then applies the sampling rate adjustment parameter to output the sampling rate-adjusted baseband signal to the FFT 78, which processes the sampling rate adjusted baseband signal as described above with reference to FIG. 3. In all other respects, the TV band device 50*d* operates the same as the TV band device 50 described above with reference to FIG. 3.

Three examples of apparatus used to adjust signal frequency to align the spectrum peak with a DFT-bin frequency prior to spectrum coherent averaging, and two examples of apparatus to adjust the sampling rate at the input of the FFT to align the spectrum peak with the DFT-bin frequency prior to spectrum coherent averaging have been described. However, those skilled in the art will appreciate that this does not exhaust the possibilities for frequency adjustment or sampling rate adjustment. Other alternatives will be within the scope of persons skilled in the art. The scope of the invention is therefore intended to be limited only by the scope of the appended claims.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

We claim:

1. A method of detecting the presence of a digital television (DTV) pilot tone in a high noise environment, comprising:
    computing a power average of a plurality of Fast Fourier Transform (FFT) output spectra of a digital baseband signal derived from a TV band channel to create a power averaged output spectrum;
    estimating a power peak in the power averaged output spectrum;
    computing based upon the estimated power peak, an adjustment parameter to adjust the signal to center the power peak in a Discrete Fourier Transform (DFT) bin of the FFT output spectra;
    applying the computed parameter to adjust the signal;
    computing a coherent average of FFT output spectra of the adjusted signal;
    computing a power spectrum of the coherent averaged output spectrum;
    testing the power spectrum for the DTV pilot tone by identifying a peak power in the power spectrum of the coherent averaged output spectrum; and
    determining whether the test exceeds a threshold.

2. The method as claimed in claim 1 wherein computing the power average comprises computing:

$$\overline{P}_k = 1/N \sum_{i=1}^{N} |X_k^{real}(i) + jX_k^{imag}(i)|^2$$

Where: $\overline{P}_k$ is the power average;
    $|X_k(i)| = |X_k^{real}(i) + jX_k^{imag}(i)|$ is the DFT magnitude for DFT bin k at i-th averaging cycle;
    $k = 1, 2, \ldots, N_{FFT}$; and
    $X_k^{real}(i)$ & $X_k^{imag}(i)$ are the in-phase and quadrature components of the FFT output of the k-th bin in the i-th averaging cycle.

3. The method as claimed in claim 2 wherein computing the adjustment parameter comprises computing a frequency adjustment parameter.

4. The method as claimed in claim 3 further comprising computing a normalized offset of the power peak from a center of a DFT-bin with a highest power magnitude; using:

$$\delta = \frac{|X_{k_{max}+1}| - |X_{k_{max}-1}|}{2 \times (2 \times |X_{k_{max}}| - |X_{k_{max}+1}| - |X_{k_{max}-1}|)}$$

Where: δ is the normalized offset of the power peak from the DFT-bin ($k_{max}$) with the highest power magnitude;
$k_{max}$ is the DFT bin number with the highest power magnitude;
$k_{max}$+1 is a next higher DFT bin number; and
$k_{max}$−1 is a next lower DFT bin number.

5. The method as claimed in claim 4 wherein computing the frequency adjustment parameter further comprises computing a frequency offset (Δf) of the DTV pilot tone with respect to the center of a DFT bin as follows:

$$\Delta f = \left(\frac{f_{s\_bb}}{N_{DFT}}\right) \times \delta$$

Where: $f_{s\_bb}$ is the signal sampling rate; and
$N_{DFT}$ is the DFT length.

6. The method as claimed in claim 5 further comprising estimating a frequency ($f_P$) of the power peak by computing:

$$f_P = (k_{max} + \delta) \times \left(\frac{f_S}{N_{DFT}}\right).$$

7. The method as claimed in claim 6 further comprising computing the frequency adjustment parameter ($f_{Corr}$) by computing:

$$f_{Corr} = -\Delta f = -\left(\frac{f_{s\_bb}}{N_{DFT}}\right) \times \delta.$$

8. The method as claimed in claim 1 wherein computing the adjustment parameter comprises computing a sampling rate adjustment parameter.

9. The method as claimed in claim 8 wherein computing the sampling rate adjustment parameter comprises computing a normalized offset of the power peak from a center of a DFT-bin ($k_{max}$) having a highest power magnitude:

$$\delta = \frac{|X_{k_{max}+1}| - |X_{k_{max}-1}|}{2 \times (2 \times |X_{k_{max}}| - |X_{k_{max}+1}| - |X_{k_{max}-1}|)}$$

Where: δ is normalized offset of the power peak from the center of the DFT-bin ($k_{max}$);
$k_{max}$ is a DFT bin number with a maximum bin magnitude;
$k_{max}$+1 is a next higher DFT bin number; and
$k_{max}$−1 is a next lower DFT bin number.

10. The method as claimed in claim 9 wherein computing the sampling rate adjustment parameter further comprises computing:

$$\beta = \frac{\delta}{k_{max}}$$

Where: β is the sampling rate adjustment parameter.

11. The method as claimed in claim 10 wherein applying the adjustment parameter comprises computing:

$$f_{s\_new} = f_s \times (1+\beta)$$

Where: $f_{s\_new}$ is the adjusted sampling rate.

12. The method as claimed in claim 1 wherein computing the coherent average comprises computing:

$$\overline{X}_k = \frac{1}{M} \sum_{i=1}^{M} (X_k^{real}(i) + jX_k^{imag}(i))$$

Where: $\overline{X}_k$ is the coherent average;
k=1, 2, . . . , $N_{FFT}$; and
i=1, 2, . . . M.

13. The method as claimed in claim 12 wherein testing the power spectrum for the DTV pilot tone comprises identifying a DFT bin number ($k_{peak}$) with a peak power ($P_{Max}$) in the power spectrum.

14. The method as claimed in claim 13 further comprising computing a noise floor around $P_{Max}$ using a programmable number ($k_N$) of DFT bins around $P_{max}$.

15. The method as claimed in claim 14 wherein ($K_{N-PSD}$) defines a set of DFT bins used to compute a noise floor power spectral density around ($P_{Max}$) as follows:

$$K_{N-PSD} = \lfloor k_{peak}-1-k_N, k_{peak}-2 \rfloor \cup \lfloor k_{peak}+2, k_{peak}+1+k_N \rfloor.$$

16. The method as claimed in claim 15 noise power spectral density in then computed using the following DFT bins:

$$k \in K_{N-PSD}.$$

17. The method as claimed in claim 16 wherein the noise power spectral density ($N_{PSD}$) is computed as follows:

$$N_{SPD} = \left(\frac{1}{2 \times k_N}\right) \sum_{k \in K_{N-PSD}} |X_k|^2.$$

18. The method as claimed in claim 17 wherein determining whether the test exceeds a threshold comprises computing:

$$\frac{P_{max}}{N_{PSD}} \geq \tau$$

Where: (τ) is the threshold and is programmable.

19. Apparatus that detects the presence of a digital television (DTV) pilot tone in a high noise environment, comprising:
a spectrum power averager that averages a plurality of output spectra of a Fast Fourier Transform (FFT) of a baseband signal derived from a television band channel to create an averaged output spectrum;
a peak frequency estimator that estimates a peak power of the averaged output spectrum, determines a frequency of the peak power and computes a frequency adjustment parameter to center the peak power in a Discrete Fourier Transform bin of the output spectra;
a complex frequency shifter that uses the frequency adjustment parameter to adjust a frequency of the signal to center the peak power in the Discrete Fourier Transform bin;
a spectrum coherent averager that averages output spectra of a FFT of the baseband signal at the adjusted frequency and computes a power spectrum from the coherent average;
a peak search algorithm that computes a peak power in the computed power spectrum;

a noise floor estimator that computes a noise floor around the peak power of the computed power spectrum; and a pilot tone tester that compares the peak power of the computed power spectrum with the noise floor to determine if the DTV pilot tone has been detected when a threshold has been exceeded.

20. Apparatus that detects the presence of a digital television (DTV) pilot tone in a high noise environment, comprising:

a spectrum power averager that averages output spectra of a Fast Fourier Transform (FFT) of a baseband signal derived from a television band channel;

a peak frequency estimator that estimates a peak power of the averaged output spectra, determines a frequency of the peak power and computes a frequency adjustment parameter to center the peak power in a Discrete Fourier Transform bin of the FFT output spectrum;

an analog radio frequency front end which uses the sampling rate adjustment parameter to re-program a high-resolution programmable phase locked loop (PLL) that permits a tuning frequency to be programmed to effect the frequency adjustment;

a spectrum coherent averager that averages output spectra of a FFT of the baseband signal at the adjusted frequency and computes a power spectrum from the coherent average;

a peak search algorithm that computes a peak power in the computed power spectrum;

a noise floor estimator that computes a noise floor around the peak power of the computed power spectrum; and a pilot tone tester that compares the peak power of the computed power spectrum with the noise floor to determine if the DTV pilot tone has been detected.

21. Apparatus that detects the presence of a digital television (DTV) pilot tone in a high noise environment, comprising:

a spectrum power averager that averages output spectra of a Fast Fourier Transform (FFT) of a baseband signal derived from a television band channel;

a peak frequency estimator that estimates a peak power of the averaged output spectra, determines a frequency of the peak power and computes a frequency adjustment parameter to center the peak power in a Discrete Fourier Transform bin of the output spectrum;

a digital mixer that uses the frequency adjustment parameter to re-program a digital phase locked loop or a direct digital synthesizer that permits a mixing frequency to be tuned to effect the frequency adjustment;

a spectrum coherent averager that averages output spectra of a FFT of the baseband signal at the adjusted frequency and computes a power spectrum from the coherent average;

a peak search algorithm that computes a peak power in the computed power spectrum;

a noise floor estimator that computes a noise floor around the peak power of the computed power spectrum; and a pilot tone tester that compares the peak power of the computed power spectrum with the noise floor to determine if the DTV pilot tone has been detected.

22. Apparatus that detects the presence of a digital television (DTV) pilot tone in a high noise environment, comprising:

a spectrum power averager that averages output spectra of a Fast Fourier Transform (FFT) of a baseband signal derived from a television band channel;

a peak frequency estimator that estimates a peak power of the averaged output spectra, determines a frequency of the peak power and computes a sampling rate adjustment parameter to center the peak power in a Discrete Fourier Transform bin of the output spectrum;

a phase locked loop that generates an analog-to-digital sampling clock and uses the sampling rate adjustment parameter to adjust the analog-to-digital sampling clock to effect the sampling rate adjustment;

a spectrum coherent averager that averages output spectra of a FFT of the baseband signal at the adjusted sampling rate and computes a power spectrum from the coherent average;

a peak search algorithm that computes a peak power in the computed power spectrum;

a noise floor estimator that computes a noise floor around the peak power of the computed power spectrum; and a pilot tone tester that compares the peak power of the computed power spectrum with the noise floor to determine if the DTV pilot tone has been detected.

23. Apparatus that detects the presence of a digital television (DTV) pilot tone in a high noise environment, comprising:

a spectrum power averager that averages output spectra of a Fast Fourier Transform (FFT) of a baseband signal derived from a television band channel;

a peak frequency estimator that estimates a peak power of the averaged output spectra, determines a frequency of the peak power and computes a fractional rate adjustment parameter to center the peak power in a Discrete Fourier Transform (DFT) bin of the output spectrum;

a fractional sampling rate converter that uses the fractional rate adjustment parameter to adjust the sampling rate to center the peak power in the DFT bin;

a spectrum coherent averager that averages output spectra of a FFT of the baseband signal at the adjusted sampling rate and computes a power spectrum from the coherent average;

a peak search algorithm that computes a peak power in the computed power spectrum;

a noise floor estimator that computes a noise floor around the peak power of the computed power spectrum; and a pilot tone tester that compares the peak power of the computed power spectrum with the noise floor to determine if the DTV pilot tone has been detected.

* * * * *